Sept. 18, 1962 R. R. HARTLEY 3,054,560

COMPUTER TEST AND CHANGE-OVER CIRCUIT

Filed Feb. 4, 1958 2 Sheets-Sheet 1

INVENTOR.
Robert R. Hartley
BY
W. L. Stout
HIS ATTORNEY

Sept. 18, 1962 R. R. HARTLEY 3,054,560

COMPUTER TEST AND CHANGE-OVER CIRCUIT

Filed Feb. 4, 1958 2 Sheets-Sheet 2

INVENTOR.
Robert R. Hartley
BY
W. L. Stout.
HIS ATTORNEY

United States Patent Office 3,054,560
Patented Sept. 18, 1962

3,054,560

COMPUTER TEST AND CHANGE-OVER CIRCUIT

Robert R. Hartley, O'Hara Township, Allegheny County, Pa., assignor to Westinghouse Air Brake Company, Wilmerding, Pa., a corporation of Pennsylvania Filed Feb. 4, 1958, Ser. No. 713,237
8 Claims. (Cl. 235—151)

Figure 1:
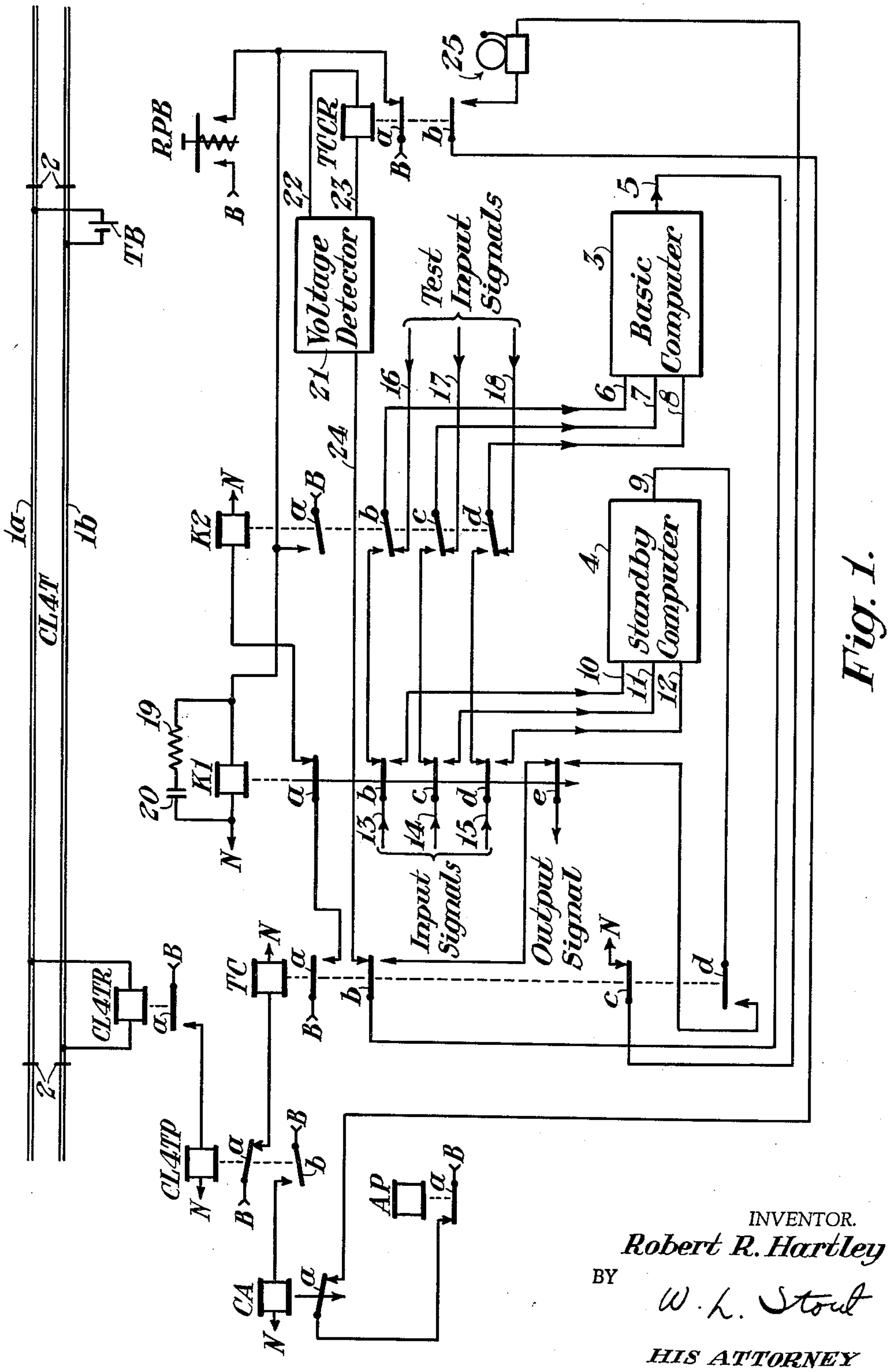

This invention relates to electrical apparatus, and in particular to a computer test and change-over circuit for checking the operation of a computer and substituting a standby computer when the test indicates a faulty operation.

In many present day control systems, automatic computers are employed which control apparatus in accordance with signals developed as a desired function of predetermined input signals, which may be derived from the measurement of parameters affecting the operation of the system. The value of such computers depends to a large extent upon the fidelity with which they produce the desired response in accordance with changing system conditions. At times, such computers may develop failures or inaccuracies which prevent them from properly performing their function, and it is then necessary to interrupt their operation to make adjustments or repairs. However, the failure of a computer in a complex system may result in great damage or economic loss, and it is therefore undesirable to allow the equipment to operate until a failure has occurred. Accordingly, since it is not known in advance when a failure may occur, it has been the practice to interrupt the operation of computers at predetermined intervals for test purposes. Such regular interruption represents an economic loss, whether or not a failure is found to have occurred. However, this loss would be greatly reduced, if not eliminated, if the system could continue to function while the computer was under test or repair. Accordingly, it is an object of my invention to provide a computer test and change-over circuit comprising means for automatically testing a computer during intervals in which its operation is not required, and for automatically substituting a standby computer when a failure is found to have occurred.

One system of the class described is shown and described in the copending application of David P. Fitzsimmons and Willam A. Robison, Jr., Serial No. 676,730, filed August 7, 1957 for Automatic Control System for Railway Classification Yards, and assigned to the assignee of my present application. In the copending application, a system is shown for automatically classifying cars or cuts of cars in a classification yard and for controlling the speed of each car to a safe value for coupling with preceding cars on a selected storage track in the yard. In this system, a plurality of group retarders are provided for controlling the speed of cars, and with each group retarder a computer is associated to compute the desired leaving speed of each car from measured parameters affecting its rolling characteristics as the car occupies an approach track section in advance of the retarder in its route. Each of these computers has an active or operating cycle which extends for the time that the approach track section is occupied, and an inactive cycle during the time that the section is unoccupied. It is a more particular object of my invention to provide a computer test and change-over circuit for computers used in such a system, comprising means actuated during each inactive cycle of the computer for testing it in order to determine whether it is functioning properly.

It is a further object of my invention to provide a computer test and change-over circuit for a system of the kind described in the above copending application in which means are provided for testing the operation of each computer during each inactive cycle, and in which means are further provided for switching over to a standby computer for the next active cycle if the test computer is indicated to be in error.

Other objects and further advantages of my invention will become apparent to those skilled in the art as the description proceeds.

In practicing my invention, in accordance with one embodiment thereof, I provide means responsive to the active or inactive condition of the computer for supplying either a set of input signals to the computer or a set of test input signals to the computer according as the computer is in its active or inactive cycle, respectively. I further provide relay means which are energized in either the active cycle of the computer or in the inactive cycle when the computer is properly operating, which relay means control contacts closed in the deenergized condition for supplying computer input signals to a standby computer. In addition, I provide means which are operative a predetermined interval after the transition of the computer from its active to its inactive cycle to provide an alarm signal when the computer has failed to operate satisfactorily.

In accordance with a second embodiment of my invention, which is adapted to be employed with computers of the type having an output controlled in accordance with the position of a servomotor output shaft, I provide means controlled by the servomotor to supply a voltage to keep the computer in circuit when it is properly operating on the applied test input signals.

I shall first describe two embodiments of my invention in detail, and shall then point out the novel features thereof in claims.

In describing my invention, in order to simplify the drawings, I shall designate a basic D.C. power supply, which is employed to operate various relays, by the symbols B and N associated with arrow symbols which represent the positive and negative terminals, respectively, of the source. Since the apparatus of my invention is intended to be employed with any kind of computer apparatus, I shall show this apparatus schematically in block form. Input and output circuits to the computers so shown will be indicated by single leads, which may be considered to be at potentials referenced to a common potential, not shown.

In the drawings, corresponding parts are designated by correspoding reference characters in each of the views.

Figure 2:
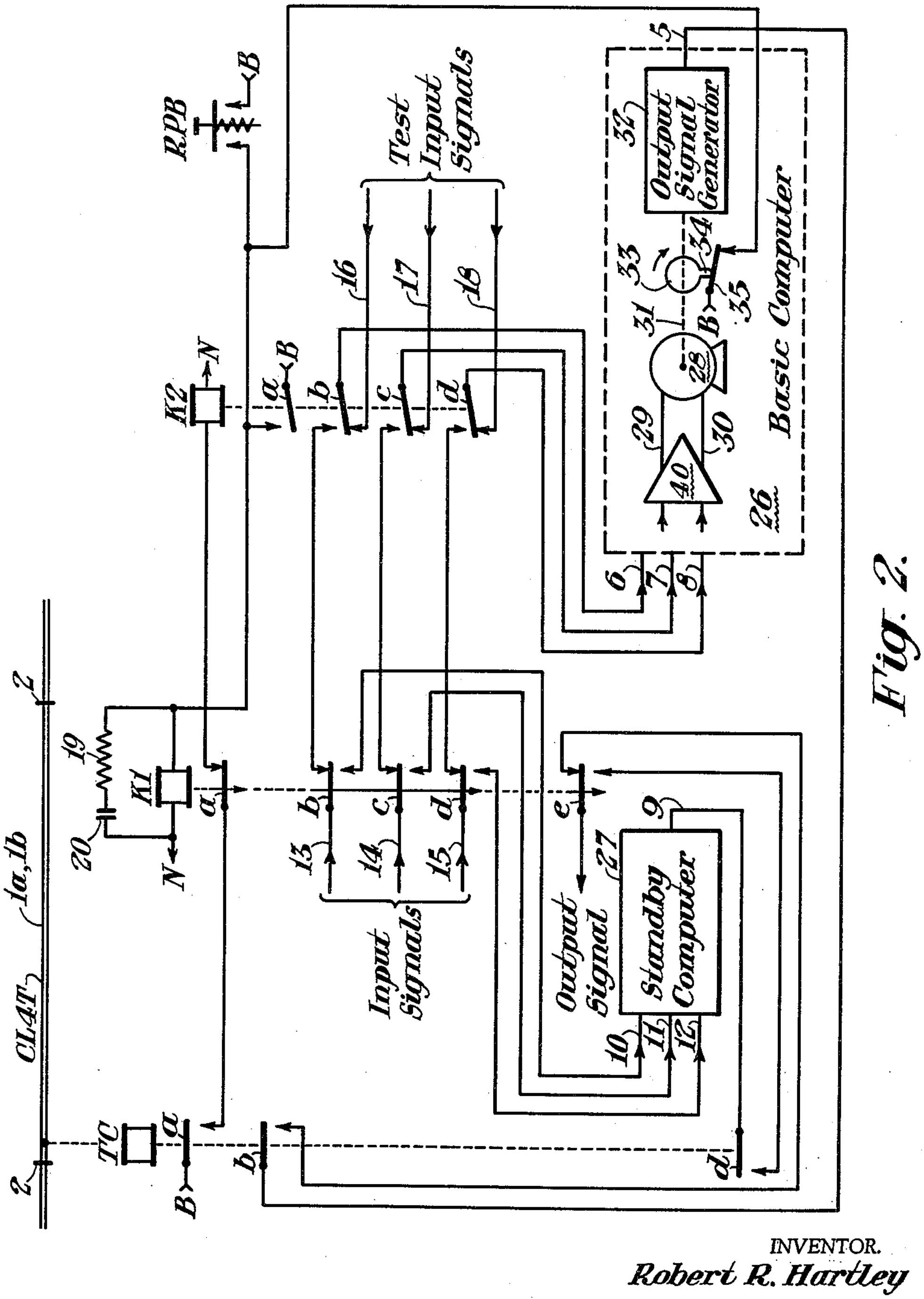

In the drawings, FIG. 1 is a schematic diagram of one embodiment of my invention, and FIG. 2 is a schematic diagram of a second embodiment of my invention, adapted to be employed with computers of the kind using servomotors.

Referring now to FIG. 1 of the drawings, I have shown a first embodiment of my invention which is adapted to be employed with apparatus of the class described and claimed in the above copending application Serial No. 676,730.

Referring now to FIGS. 12 and 13 of that application, a computer 22 is shown associated with a group retarder having an approach track section CL4T. This computer, as shown in FIG. 13, has a plurality of inputs which are operative as described in the copending application to produce a single output signal V3 which represents the desired leaving speed of a cut of cars from the group retarder.

In FIG. 1 of the present application, I have shown the above-mentioned track section CL4T as being formed on a stretch of track comprising rails *1a* and *1b* by conventional insulated joints 2. This track section may be provided with a conventional track battery TB connected across the rails at one end thereof and a track relay CL4TR connected across the rails at the other end thereof in a conventional manner, whereby relay CL4TR is energized or deenergized according as track section CL4T is unoccupied or occupied, respectively.

I provide a basic computer 3, which may correspond to computer 22 as schematically shown in FIG. 13 of application Serial No. 676,730, and which is elsewhere shown and described in detail in that application, and a standby computer 4, which may be structurally identical with basic computer 3. Computer 3 is adapted to provide an output signal on output lead 5 in response to inputs, here represented as applied to input leads 6, 7 and 8, in accordance with a desired function of the inputs. Similarly, computer 4 is adapted to produce a corresponding output voltage on its output lead 9 in response to corresponding inputs supplied to typical input leads 10, 11 and 12. Obviously, this representation is merely illustrative, since a computer having any desired number of inputs and outputs could be employed within the scope of my invention if so desired.

Computers 3 and 4 are at times energized from a plurality of input signals which may be supplied from any suitable apparatus, not shown, and for example, from the apparatus shown in the above-mentioned copending application, applied to leads 13, 14 and 15. Computer 3 may be supplied from these input signals over circuits extending from leads 13, 14 and 15 over the front point of contacts *b*, *c* and *d*, respectively, of relay K1, to be described, the front points of contacts *b*, *c* and *d*, respectively, of relay K2, to be described, and leads 6, 7 and 8, respectively. Standby computer 4 may be supplied from input leads 13, 14 and 15 over the back points of contacts *b*, *c* and *d*, respectively, of relay K1 and leads 10, 11 and 12, respectively.

Basic computer 3 may be supplied by a group of test input signals applied to leads 16, 17 and 18 from any suitable apparatus, and for example from the apparatus shown in the above-mentioned copending application, over a circuit extending from leads 16, 17 and 18 over the backpoints of contacts *b*, *c* and *d*, respectively, of relay K2, and leads 6, 7 and 8, respectively. These signals comprise predetermined values which will produce a predetermined output signal on lead 5 if the computer is operating properly, and a suitable set may easily be selected for any particular computer. The details of such a set of test values, and means for providing them, are fully described in the above-mentioned copending application Serial No. 676,730, and will not be described here, since it is immaterial to my invention what suitable signals are employed.

As shown in FIG. 1, in accordance with this embodiment of my invention, I provide a first group of control relays comprising relays CL4TP TC, CA and AP for programming purposes. The control circuits for these relays will now be described.

Relay CL4TP is a direct back contact repeater of track relay CL4TR and is energized over an obvious circuit extending from terminal B of the battery over back contact *a* of relay CL4TR, and through the winding of relay CL4TP to terminal N of the battery. This relay is accordingly picked up when section CL4T is occupied by a cut and indicates by its energized condition that the computer is to be transferred to its active cycle.

Test compute relay TC has an obvious control circuit extending from terminal B of the battery over back contact *a* of relay CL4TP, and through the winding of relay TC to terminal N of the battery. This relay is energized withn track section CL4T is unoccupied and is deenergized when track section CL4T is occupied. It will be apparent that for the purposes of my invention the contacts of this relay could be replaced by contacts of track relay CL4TR. However, in the practical embodiment shown, it is desirable to provide all of relays CL4TR, CL4TP and TC, since in the complete system these relays have other functions. Further, it may be desirable to provide only a single contact on a track relay so that the track relay may be made more sensitive.

Control relay CA has an obvious energizing circuit extending from terminal B of the battery over front contact *b* of relay CL4TP and through its winding to terminal N of the battery. This relay is accordingly picked up when track section CL4T is occupied. As shown, relay CA is provided with a slow release time, which may be on the order of from one to several seconds, as may be required in a particular case by the time necessary for the computer to modify its output from an actual solution to a test solution. This relay is provided to delay the energization of an alarm circuit, to be described, until the computer has had sufficient time in which to respond.

Control relay AP is energized over a circuit, not shown, which is described in detail in the above-mentioned copending application. Briefly, this relay may be controlled over contacts of control levers provided for the group retarder associated with track section CL4T, which are closed to energize the relay at all times when the apparatus is in its automatic condition, and are opened to deenergize the relay when it is desired to operate manually. This relay may be considered to be energized at all times for the purposes of my invention, and is shown primarily to facilitate comparison of FIG. 1 with the drawings of the complete system in the copending application. As shown in FIG. 1, two additional control relays K1 and K2 are provided. The control circuits for these relays will now be described.

Relay K1 has a first pickup circuit extending from terminal B of the battery over front contact *a* of relay K2, to be described, and through the winding of the relay to terminal N of the battery. This circuit is normally closed during the active cycle of the computer, as will appear. Relay K1 has a second pickup circuit which extends from terminal B of the battery over the contacts of a reset push button RPB, which is spring biased to an open condition as schematically indicated, and through the winding of relay K1 to terminal N of the battery. As will appear, this circuit is completed temporarily when it is desired to place basic computer 3 back in operation, after repairs, during a normally active cycle. Relay K1 has a third pickup circuit which extends from terminal B of the battery over front contact *a* of relay TCCR, to be described, and through the winding of relay K1 to terminal N of the battery. As will appear, this circuit is energized during the inactive or test cycle of the computer when basic computer 3 is properly responding to the applied test compute signals. As shown, relay K1 is made slow releasing by the provision of a shunt path including a resistor 19 and condenser 20 in series. In accordance with one practical embodiment, these components may be selected to give relay K1 a delayed release of about three seconds in order to give the computer time to properly respond to the test compute signals.

Relay K2 has an energizing circuit which extends from terminal B of the battery over back contact *a* of relay TC, front contact *a*, of relay K1, and through the winding of relay K2 to terminal N of the battery. As will appear, relay K2 is picked up by this circuit during an active cycle when basic computer 3 is operating normally.

A voltage detector 21 is provided in order to check that the solution produced by computer 3 in response to the test input signals is correct. This coltage detector may be of the kind shown and described in the copending application of James A. Cook, Jr. and Roelif Stapelfeldt, Serial No. 676,731, filed August 7, 1957, now Patent No. 2,965,889, for Voltage Detector Circuit and assigned to the assignee of the present application. The details of a voltage detector of this kind are also shown and described in the above-mentioned copending application No. 676,730. Since the details of this component do not form a part of my present invention, they are not shown, it being sufficient to note that the voltage detector 21 will supply an output voltage between leads 22 and 23 when and only when the input voltage applied to lead 24 is within prescribed limits of a predetermined value, and for example, when the input voltage is 50 volts +0.1 volt. This input voltage is at times supplied from input lead 5 of basic computer 3 over the front point of contact *b* of relay TC to lead 24.

Relay TCCR is provided to indicate the condition of operation of voltage detector 21. When voltage detector 21 is operating in response to a proper voltage applied to its input lead 24, relay TCCR is energized by the voltage appearing across output leads 22 and 23.

A suitable indicator such as an alarm bell 25 is provided for making it known when the basic computer has failed to respond properly to a test. Alarm bell 25 has an energizing circuit which extends from terminal B of the battery over front contact *a* of relay AP, back contact *a* of relay CA, back contact *b* of relay TCCR, through the winding of bell 25, and over front contact *c* of relay TC to terminal N of the battery. As will appear, bell 25 is energized over this circuit when the apparatus is in its automatic condition as indicated by the energized condition of relay AP, when the apparatus is in its inactive cycle as indicated by the energized condition of relay TC, and when, after a suitable interval determined by the release time of relay CA, the basic computer has failed to respond properly to the test input signals as indicated by the released condition of relay TCCR.

The structure and arrangement of this embodiment of my invention having been described, its operation under typical conditions will now be described.

Assuming that track section CL4T is unoccupied, that basic computer 3 and standby computer 4 are in condition for operation, and that computer 3 is operating properly, the apparatus will assume the condition shown in FIG. 1. As shown, relay CL4TR will be energized over the rails of track section CL4T and relay CL4TP will accordingly be deenergized. Relay TC will be held up over back contact *a* of relay CL4TP. Relay CA will be released, and it may be assumed that relay AP remains energized at all times.

With relay TC energized, the previously traced energizing circuit for relay K2 will be interrupted and this relay will be released. With relay K2 released, the test input signals will be supplied to input terminals 6, 7 and 8 of basic computer 3 over leads 16, 17 and 18, respectively, and the back points of contacts *b*, *c* and *d* of relay K2, respectively. Since basic computer 3 is operating properly, its output voltage, which will now be supplied to voltage detector 21 over lead 5, the front point of contact *b* of relay TC, and lead 24, will cause the voltage detector to energize leads 22 and 23 and maintain relay TCCR in its energized condition as shown.

With relay TCCR energized, relay K1 will be energized over the previously traced circuit including front contact *a* of relay TCCR. Condenser 20 will assume a charge and will remain charged as long as the energizing circuit for relay K1 is complete.

The previously traced energizing circuit for alarm bell 25 will be interrupted at this time at the open back point of contact *b* of relay TCCR.

Next, let it be assumed that a cut enters track section CL4T, shunting rails 1*a* and 1*b* and causing track relay CL4TR to be released. Relay CL4TP will now pick up over back contact *a* of track relay CL4TR. With relay CL4TP picked up, the energizing circuit for relay TC will be interrupted and this relay will be released. At the same time, an energizing circuit for relay CA will be completed over front contact *b* of relay CL4TP and this relay will be energized. With relay CA energized, the previously traced circuit for alarm bell 25 will be interrupted at the open back point of contact *a* of relay CA.

With relay TC released, the input circuit for voltage detector 21 will be interrupted at the open front point of contact *b* of relay TC. Accordingly, output leads 22 and 23 of voltage detector 21 will become deenergized and relay TCCR will be released. With relay TCCR released, the previously traced energizing circuit for relay K1 will be interrupted, but due to the slow release of this relay provided by the charge on capacitor 20, its front contacts will temporarily remain closed.

With relay TC deenergized and relay K1 still energized, relay K2 will be picked up over back contact *a* of relay TC and front contact *a* of relay K1. With relay K2 energized, the first previously traced energizing circuit for relay K1 will be completed over front contact *a* of relay K2, relay K1 will remain energized, and the full charge will be restored to capacitor 20. With relays K1 and K2 energized, the input signals applied to leads 13, 14 and 15 will be supplied to basic computer 3 over the front points of contacts *b*, *c* and *d*, respectively, of relays K1 and K2, and leads 6, 7 and 8, respectively. Computer 3 will accordingly begin to produce an output signal in accordance with the input signals. This output signal will be supplied over lead 5, the back point of contact *b* of relay TC, and the front point of contact *e* of relay K1 and may be used for the control of suitable apparatus, not shown, an example of such apparatus being shown and described in the above-mentioned copending application No. 676,730.

When the cut vacates section CL4T, track relay CL4TR will be energized and relay CL4TP will be released. Relay TC will now pick up over back contact *a* of relay CL4TP.

With relay CL4TP released, the energizing circuit for relay CA will be interrupted at the open front point of contact *b* of relay CL4TP. However, relay CA will not release until the end of its predetermined time delay period.

In the meantime, with relay TC energized, the previously traced energizing circuit for relay K2 will be interrupted at the open back point of contact *a* of relay TC and relay K2 will release. With relay K2 released, all of the energizing circuits for relay K1 will be interrupted, but this relay is temporarily held up by the charge remaining on capacitor 20.

With relay K2 released, the test input signals will be applied to basic computer 3 over back contacts *b*, *c* and *d* of relay K2 as previously described. If computer 3 is operating properly, it will produce the proper solution on output lead 5 before relay K1 is released. When the proper solution is supplied by computer 3, voltage detector 21 will be operated over the front point of contact *b* of relay TC as previously described and will cause relay TCCR to pick up. Relay K1 will then be reenergized over front contact *a* of relay TCCR, and the apparatus will be restored to its initial condition. It will be noted that during this test operation, the circuit for alarm bell 25 was first open at the open back point of contact *a* of relay CA, and then opened at the open back point of contact *b* of relay TCCR.

Next, let it be assumed that with the apparatus in the condition shown in FIG. 1, computer 3 develops a failure and the proper output voltage is no longer supplied to voltage detector 21. Output leads 22 and 23 of voltage detector 21 will now become deenergized and relay TCCR will be released.

With relay TCCR released, the circuit for alarm bell 25 will be completed over front contact *a* of relay AP, back contact *a* of relay CA, back contact *b* of relay TCCR, the winding of bell 25, and front contact *c* of relay TC. This sounding of bell 25 will indicate to the operator that computer 3 requires servicing. With relay TCCR released, the energizing circuit for relay K1 will be interrupted, and, at the end of the predetermined time delay provided by resistor 19 and capacitor 20, relay K1 will be released.

With relay K1 released, standby computer 4 will be conditioned to receive input signals over leads 13, 14 and 15, the back points of contacts *b*, *c* and *d* of relay K1, and leads 10, 11 and 12, respectively. Standby computer 4 will now supply an output signal on lead 9. This output signal will not be supplied to the external circuitry at this time, since the output circuit is interrupted at the open back point of contact *d* of relay TC. Should track section CL4T be occupied, causing relay CL4TP to be energized and relay TC to be released as previously described, the output signal will be supplied from lead 9 over back contact *d* of relay TC and the back point of contact *e* of relay K1 to the external circuits, thus permitting the system to continue to operate while computer 3 is under repair.

Let it next be assumed that computer 3 has been repaired and is to be restored to service during an inactive cycle. With relay K2 released, as described above, test input signals will still be applied to computer 3. The output lead 5 will be connected to voltage detector 21 over the front point of contact *b* of relay TC and lead 24. Accordingly, when voltage detector 21 responds, relay TCCR will again be picked up. With relay TCCR picked up, relay K1 will again be picked up as previously described and the inputs and outputs will be disconnected from standby computer 4 at the open back points of contacts *b*, *c*, *d* and *e* of relay K1. The apparatus will then be restored to its initial condition.

Next, let it be assumed that computer 3 has failed as previously described, and that it is desired to place it back in service, after repairs, during an active cycle in which track section CL4T is occupied. Under these conditions, track relay CL4TR will be released and relay CL4TP will be energized. Accordingly, relay TC will be deenergized and relay CA will be energized.

With relay TC deenergized, voltage detector 21 will be deenergized due to the interruption of its input circuit at the open front point of contact *b* of relay TC. Accordingly, relay TCCR will be deenergized.

Since computer 3 is assumed to have originally failed under the conditions previously described, relay K1 will be deenergized and relay K2 will be deenergized due to the interruption of its energization circuit at the front open point of contact *a* of relay K1.

Input signals appearing on leads 13, 14 and 15 will be supplied to standby computer 4 over the back points of contacts *b*, *c* and *d* of relay K1, respectively, as previously described. An output will now be supplied by standby computer 4 over lead 9, back contact *d* of relay TC, and the back point of contact *e* of relay K1.

With relay CL4TP energized, and relay CA energized as previously described, the energizing circuit for alarm bell 25 will be interrupted at the open front point of contact *a* of relay CA.

To replace computer 4 with computer 3, reset push button RPB is momentarily depressed, completing the previously described energizing circuit for relay K1 and charging capacitor 20 through resistor 19. Relay K1 will now pick up and will remain up during its predetermined time delay period.

With relay K1 picked up, relay K2 will pick up over back contact *a* of relay TC and front contact *a* of relay K1. A second energizing circuit for relay K1 will now be completed over front contact *a* of relay K2.

With relays K1 and K2 energized, input signals on leads 13, 14 and 15 will be supplied to input leads 6, 7 and 8 of basic computer 3 over the front points of contacts *b*, *c* and *d*, respectively, of relays K1 and K2. Basic computer 3 will now supply an output signal over lead 5, the back point of contact *b* of relay TC, and the front point of contact *e* of relay K1. Standby computer 4 will be disconnected from the circuit as previously described. When track section CL4T is cleared, the apparatus will be restored to its initial condition as previously described.

Referring now to FIG. 2, a modification of the apparatus of FIG. 1 is shown in which computers 3 and 4 have been replaced by a basic computer 26 and a standby computer 27 having servomotor controlled outputs. For example, as shown schematically in basic computer 26, such a computer may include an output amplifier 40 controlling a servomotor 28 over leads 29 and 30 in a conventional manner, amplifier 40 being controlled in response to inputs typified by leads 6, 7 and 8 in any suitable manner known per se in the computer art.

As shown, servomotor 28 may control an output signal generator 32 of any conventional form by means of an output shaft schematically shown at 31, which may rotate in one direction or the other through an angle determined by the inputs to produce the desired output signal. A cam 33 is mounted on output shaft 31 and is provided with a projection 34 which is adapted to close a contact 35 at a predetermined shaft signal when the computer is properly operating in response to the application of a plurality of applied test input signals.

As in the modification of FIG. 1, the operation of this embodiment of my invention is divided into active and inactive cycles by any suitable means, here shown as a relay TC operated in response to the occupied or unoccupied condition of a detector track section CL4T, relay TC being energized when track section CL4T is unoccupied and deenergized when track section CL4T is occupied, as by the means shown in FIG. 1. However, it will be apparent to those skilled in the art that any other suitable control means for relay TC could be provided if so desired, the sole function of this relay being to divide the operation of the computer into active and inactive cycles.

As in the embodiment shown in FIG. 1, basic computer 26 is at times supplied with input signals on leads 13, 14 and 15 over the front points of contacts *b*, *c* and *d* of relays K1 and K2 and leads 6, 7 and 8, respectively. At other times, computer 26 is supplied with test input signals applied to leads 16, 17 and 18 thence over the back points of contacts *b*, *c* and *d* of relay K2 to leads 6, 7 and 8.

Standby computer 27 is at times supplied with input signals applied to leads 13, 14 and 15 over the back points of contacts *b*, *c* and *d* of relay K1 and leads 10, 11 and 12, respectively.

An output signal to control apparatus, not shown, is at times supplied from basic computer 26 over lead 5, back contact *b* of relay TC, and the front point of contact *e* of relay K1. At other times, standby computer 27 provides an output signal over lead 9, back contact *d* of relay TC, and the back point of contact *e* of relay K1.

In addition to the apparatus previously described, I provide relays K1 and K2, which are controlled similarly to the corresponding relays in FIG. 1. The control circuit for relay K2 is identical with that for relay K2 in FIG. 1, including back contact *a* of relay TC and front contact *a* of relay K1 in series. Relay K1 is provided with a shunt path comprising resistor 19 and capacitor 20 in series, as in the modification of FIG. 1, to provide a time delay in its release. Relay K1 has a first energizing circuit including front contact *a* of relay K2 and a second energizing circuit including the contacts of reset push button RPB which are identical with the corresponding circuits in the modification of FIG. 1. Relay K1 is provided with a third pickup circuit which corresponds in function to the circuit completed over front contact *a* of relay TCCR in FIG. 1. However, in this modification advantage is taken of the servomotor in computer 26 to eliminate some of the apparatus shown in FIG. 1. Here, the third pickup circuit for relay K1 extends from terminal B of the battery over contact 35 (when closed by projection 34 on cam 33), and through the winding of relay K1 to terminal N of the battery.

The structure and arrangement of this embodiment of my invention having been described, its operation under typical conditions will now be described.

First, let it be assumed that the apparatus is in the condition shown, with track section CL4T unoccupied. Relay TC will be energized, and relay K2 will be deenergized as shown due to the interruption of its energizing circuit at the open back point of contact *a* of relay TC.

With relay K2 deenergized, the test input signals applied to leads 16, 17 and 18 will be applied to input leads 6, 7 and 8 of basic computer 26 over the back points of contacts *b*, *c* and *d* of relay K2. Assuming the computer 26 is operating properly, amplifier 40 will cause servomotor 28 to rotate shaft 31 until cam 33 is positioned with projection 34 closing contact 35 as shown. With contact 35 closed, relay K1 will be energized over its third previously traced circuit, and will remain energized as long as the computer supplies the correct output to maintain contact 35 closed.

When track section CL4T is occupied by a cut, relay TC will be released, and relay K2 will be picked up over back contact *a* of relay TC and front contact *a* of relay K1.

With relay K2 picked up, relay K1 will be held up over front contact *a* of relay K2 regardless of the action of computer 26.

With both relays K1 and K2 picked up, the input signals applied to leads 13, 14 and 15 will be supplied to input leads 6, 7 and 8 of computer 26 over the front points of contacts *b*, *c* and *d* of relays K1 and K2. Computer 26 will now supply an output signal over lead 5, back contact *b* of relay TC and the front point of contact *e* of relay K1.

When section CL4T is vacated, relay TC will be picked up. Relay K2 will now be released as previously described.

With relay K2 released, the energizing circuit for relay K1 will be interrupted, but this relay will not yet release due to the charge on capacitor 20.

At the same time, the test input signals applied to leads 16, 17 and 18 will be supplied over the back points of contacts *b*, *c* and *d* of relay K2 to input leads 6, 7 and 8 of computer 26. Computer 26 will then operate cam 33 until contact 35 is closed. If this occurs before relay K1 is released, relay K1 will be held up over contact 35 and the apparatus will be restored to its initial condition.

However, let it be assumed that computer 26 fails to operate properly, and that projection 34 of cam 33 is moved away from contact 35 so that relay K1 is deenergized. Accordingly, at the end of its predetermined time delay period, relay K1 will release. At this time, the input leads 13, 14 and 15 will be connected to the inputs of the standby computer 27 over the back points of contacts *b*, *c* and *d* of relay K1 and leads 10, 11 and 12. Should relay TC then be released due to the occupancy of section CL4T, an output signal will be supplied over output lead 9 of standby computer 27, back contact *d* of relay TC and the back point of contact *e* of relay K1. However, should basic computer 26 be placed back in service before this occurs, it will be reconnected in the circuit in the manner previously described as soon as it properly positions cam 33 in response to the input signals.

Should it be desired to place computer 26 back in operation during an active cycle in which track section CL4T is occupied, reset push button RPB may be briefly depressed, and the resulting circuit action will be the same as that described in connection with the embodiment of FIG. 1.

While I have described only two embodiments of my invention in detail, it will be apparent to those skilled in the art after reading my description that many changes and modifications could be made within the scope of my invention. Accordingly, I do not wish to be limited to the details shown, but only by the scope of the following claims.

Having thus described my invention, what I claim is:

1. In an operational control system, computer test and change-over apparatus, comprising, in combination, a first computer, a second computer, programming means having first and second operative conditions, actuating means responsive to system operation for driving said programming means successively between its first and second conditions during a selected period of operation, means controlled by said programming means in its first condition for applying predetermined values of a set of input signals to said first computer to produce a predetermined output signal when said first computer is operating properly, checking means actuated by said predetermined output signal from a first condition to a second condition, means controlled by said programming means and said checking means in their second conditions for connecting said first computer into a system circuit, and other means controlled by said programming means in its second condition and by said checking means in its first condition for connecting said second computer into said system circuit, whereby said second computer is substituted for said first computer when and only when said first computer fails to operate properly.

2. Apparatus of the class described, comprising, in combination, first relay means, means for energizing said first relay means during a selected interval, second relay means having a slow release characteristic, third relay means, fourth relay means, energizing circuit means for said third relay means comprising a contact of said first relay means closed in its deenergized condition and a contact of said second relay means closed in its energized condition, energizing circuit means for said second relay means comprising, in parallel, contacts of said third and fourth relay means closed in their energized conditions and a manually operable contact, voltage detector means operable in response to a predetermined applied voltage for energizing said fourth relay means, a first computer, means comprising contacts of said third relay means closed in its deenergized condition for applying predetermined input signals to said computer to produce an output voltage equal to said predetermined voltage when said computer is operating properly, means comprising a contact of said first relay means closed in its energized condition for applying the output of said computer to said voltage detector means, means comprising contacts of said second and third relay means closed in their energized conditions for applying variable input signals to said computer to produce an output signal in accordance with a predetermined function thereof, means comprising a contact of said first relay means closed in its deenergized condition and a contact of said second relay means closed in its energized condition for supplying the output of said computer to an external device, a second computer, means comprising contacts of said second relay means in its deenergized condition for supplying said variable input signals to said second computer to produce an output signal in accordance with said function thereof, and means comprising a contact of said first relay means in its deenergized condition and said second relay means in its deenergized condition for supplying the output of said second computer to said external device.

3. Apparatus of the class described, comprising, in combination, first relay means controlled to an energized or a deenergized condition in accordance with a desired program, second slow release relay means, third relay means, a manually operable contact, a first computer comprising a signal generator driven by a servomotor output shaft in accordance with applied input signals to produce an output signal in accordance with a predetermined function of said input signals, a contactor closed by said shaft in a predetermined position, energizing circuit means for said second relay means comprising a contact of said third relay means closed in its energized condition, said manually operable contactor, and said shaft actuated contactor in parallel, energizing circuit means for said third relay means comprising a contact of said first relay means closed in its deenergized condition and a contact of said second relay means closed in its energized condition, a second computer for producing an output signal in accordance with said predetermined function of applied input signals, means comprising contacts of said third relay means in its deenergized condition for applying predetermined input signals to said first computer to drive said shaft to said predetermined position, means comprising contacts of said second and third relay means closed in their energized conditions for applying variable input signals to said first computer, means comprising contacts of said second relay means closed in its deenergized condition for applying said variable input signals to said second computer, means comprising a contact of said second relay means closed in its energized condition for supplying the output of said first computer to an external device, and means comprising a contact of said second relay means closed in its deenergized condition for supplying the output of said second computer to said external device.

4. Control apparatus for a system having first and second conditions occurring successively during a selected period of operation, comprising, in combination, first means successively actuated to a first or a second condition according as said system is in its first or its second condition, respectively, a first computer, a second computer, means for checking the operation of said first computer during each first condition period of said first means and actuated to a first or a second condition according as said first computer is operating properly or improperly, respectively, and means controlled by said first means in its second condition and said checking means for operatively connecting said first computer or said second computer in said system according as said checking means is in its first or its second condition, respectively.

5. Control apparatus for a system comprising a plurality of terminals to which input signals are applied and an output terminal to which an output signal is to be applied as a predetermined function of the values of said input signals, first and second computers having input and output terminals corresponding to said system terminals for developing an output signal as said predetermined function of said input signals when said computer terminals are connected to said system terminals, first relay means actuated to a first or a second condition according as said system is in an inactive or an active condition, respectively, second relay means, third relay means, means controlled by said third relay means in its deenergized condition for applying predetermined signal values to the input terminals of said first computer, means controlled by said first computer for energizing said second relay means when said first computer output corresponds to the value of said predetermined function of said predetermined values, means controlled by said third relay means in its energized condition for energizing said second relay means, means controlled by said first relay means in its second condition and said second relay means in its energized condition for energizing said third relay means, means controlled by said second and third relay means in their energized conditions for connecting said system input terminals to the input terminals of said first computer, means controlled by said second relay means in its deenergized condition for connecting said system input terminals to the input terminals of said second computer, and means controlled by said first relay means in its second condition and said second relay means for connecting the output terminal of said first or said second computer to said system output terminal according as said second relay means is in its energized or deenergized condition, respectively.

6. In combination with a track section in a stretch of track, detector means actuated from a first to a second condition by cars occupying said section, first relay means, second relay means, means controlled by said detector means in its second condition and said first relay means in a first condition for actuating said second relay means from a first condition to a second condition, means controlled by said second relay means in its second condition for actuating said first relay means to its first condition, a computer, means controlled by said second relay means in its first condition for applying signals to said computer to test its operation, third relay means actuated from a first to a second condition by said computer when operating properly in response to said applied signals, means controlled by said third relay means in its second condition for actuating said first relay means to its first condition, and alarm means controlled by said third relay means in its second condition and said detector means in its first condition.

7. In combination with a track section in a stretch of track, detector means actuated from a first to a second condition by cars occupying said section, first relay means, second relay means, means controlled by said detector means in its second condition and said first relay means in a first condition for actuating said second relay means from a first condition to a second condition, means controlled by said second relay means in its second condition for actuating said first relay means to its first condition, a computer, means controlled by said second relay means in its first condition for applying signals to said computer to test its operation, means actuated from a first to a second condition by said computer when operating properly in response to said applied signals, and means controlled by said last-mentioned means in its second condition for actuating said first relay means to its first condition.

8. In combination with a track section in a stretch of track, detector means actuated from a first to a second condition by cars occupying said section, first means having first and second conditions, second means having first and second conditions, means controlled by said detector means in its second condition and said first means in its first condition for controlling said second means to its first condition, means controlled by said second means in its first condition for controlling said first means to its first condition, a first computer, a second computer, means controlled by said second means in its second condition for applying signals to said first computer to test its operation, third means controlled from a first to a second condition by said first computer when operating properly in response to said applied signals, means controlled by said third means in its its second condition for controlling said first means to its first condition, a plurality of input circuits and an output circuit, means controlled by said detector means in its second condition and said first means in its first condition for connecting said input and output circuits to said first computer, and means controlled by said detector means and said first means in their second conditions for connecting said input and output circuits to said second computer.

References Cited in the file of this patent

UNITED STATES PATENTS

| | | |
|---|---|---|
| 2,340,809 | Hatton et al. | Feb. 1, 1944 |
| 2,381,250 | Baumann | Aug. 7, 1945 |
| 2,531,448 | Lingenfelder | Nov. 28, 1950 |
| 2,756,409 | Lubkin | July 24, 1956 |

OTHER REFERENCES

Alrich: Electro Data Digital Computer, IRE Transactions, vol. EC-4, No. 1, March 1955, pages 8, 9.

McDonald et al.: Components at Work, Control Engineering, February, 1956, pages 82, 2.

Astrahan et al.: Logical Design of the Digital Computer for the Sage System, IBM Journal of Research and Development, Jan. 1957, pp. 76 to 83.

A Functional Description of the EDVAC published by the University of Pennsylvania, vol. 1, Nov. 1949, pp. 4-1 and 4-3.

Doyle et al.: Automatic Failure Recovery in a Digital Data Processing System, IBM Journal of R. & D., vol. 3, No. 1, Jan, 1959 (pages 2 to 12).